US005948494A

United States Patent [19]

Levin

[11] Patent Number: 5,948,494

[45] Date of Patent: Sep. 7, 1999

[54] COMPOSITE SHEET AND SHEET STACK

[76] Inventor: Herbert L. Levin, 215 Fox Hill Rd., Needham, Mass. 02192

[21] Appl. No.: 08/865,522

[22] Filed: May 29, 1997

[51] Int. Cl.[6] .............................. B32B 3/10; B42D 5/00

[52] U.S. Cl. .............................. 428/43; 281/15.1; 281/16; 281/44; 283/81; 402/63; 462/63; 462/72; 462/900; 462/901; 428/40.1; 428/42.2; 428/42.3; 428/194

[58] Field of Search .............................. 428/40.1, 43, 194, 428/42.2, 42.3; 283/81; 402/63; 462/72, 63, 900, 901; 281/15.1, 16, 44

[56] References Cited

U.S. PATENT DOCUMENTS

| | | | |
|---|---|---|---|
| 4,447,481 | 5/1984 | Holmberg | 428/194 |
| 4,495,318 | 1/1985 | Howard | 524/375 |
| 4,500,021 | 2/1985 | Bildusas | 428/194 |
| 4,529,226 | 7/1985 | Weinman | 281/15.1 |
| 4,781,306 | 11/1988 | Smith | 221/33 |
| 4,789,187 | 12/1988 | Corlew et al. | 428/40.1 |
| 4,822,074 | 4/1989 | Hueffman et al. | 281/15.1 |
| 4,934,740 | 6/1990 | Drake | 281/16 |
| 5,030,491 | 7/1991 | Shoesmith | 428/41.1 |
| 5,050,909 | 9/1991 | Mertens | 281/16 |
| 5,202,169 | 4/1993 | Spendlove | 428/43 |
| 5,299,833 | 4/1994 | Madole, Jr. | 281/2 |
| 5,328,409 | 7/1994 | Marquadt | 462/17 |
| 5,376,205 | 12/1994 | Drake | 281/16 |
| 5,390,819 | 2/1995 | Kaye | 221/45 |
| 5,702,789 | 12/1997 | Fernandez-Kirchberger | 428/40.1 |

*Primary Examiner*—Nasser Ahmad
*Attorney, Agent, or Firm*—Bachman & LaPointe, P.C.

[57] ABSTRACT

Composite sheet used as a component of a pad including a stack of like composite sheets and a pad comprising a plurality of like composite sheets. The sheets include at least one perforation line permitting separation of the sheet into at least two separate sheets, and a layer of pressure sensitive adhesive on the bottom surface of the sheet and covering at least a portion of the bottom surface of each separate sheet.

15 Claims, 3 Drawing Sheets

COMPOSITE SHEET AND SHEET STACK

BACKGROUND OF THE INVENTION

The present invention relates to composite sheets which may be used as a component of a pad including a stack of like composite sheets, particularly such sheets having a pressure sensitive adhesive on the bottom surface thereof permitting a sheet removed from the stack or pad to be adhered to a surface.

Pads containing sheets of this type are in common use, as for example, for note taking and adhering the removed sheet with note thereon to a secondary surface. These pads have enjoyed widespread use and are available in a variety of sizes.

Indeed, the various size pads makes it quite common for a user to keep several different size pads readily available when notes or messages of different lengths are required. Obviously, this is an inconvenience.

Thus, if a single pad with large sheets is used it would be wasteful to use one of the sheets for a small message or note; whereas, if a pad with small sheets is used multiple sheets may be required for a single message or note.

U.S. Pat. No. 5,050,909 for STACK OF SHEET ASSEMBLIES is representative of the current state of the art.

It would be highly desirable to overcome the foregoing disadvantages and to provide a composite sheet used as a component of a pad including a stack of like composite sheets which enable one to design the needed size sheet for the desired message or note, with the designed size having a layer of pressure sensitive adhesive on the bottom surface of a separated portion of the composite sheet. This would eliminate the need for maintaining a variety of different size pads, with the inconvenience attendant thereon.

SUMMARY OF THE INVENTION

In accordance with the present invention, the foregoing objects and advantages are readily obtained.

The present invention provides a composite sheet used as a component of a pad including a stack of like composite sheets, including: a paper sheet having a top surface, a bottom surface, a bindable end, a free end, and sides joining said ends; at least one perforation line in said sheet permitting separation of said paper sheet into at least two separate sheets each of which is smaller than the paper sheet; and a layer of pressure sensitive adhesive on the bottom surface of said paper sheet and covering at least a portion of the bottom surface of each separate sheet. Preferably, the sheet includes a plurality of said perforation lines permitting separation of said paper sheet into a plurality of separate sheets each of which is smaller than the paper sheets, wherein the bottom surface of each separate sheet includes a layer of pressure sensitive adhesive thereon.

The present invention also includes a pad comprising a plurality of such like composite sheets, said sheets being stacked together in the same orientation, with the bindable ends bound together and the top surface facing upwards.

Further features and advantages of the present invention will appear hereinbelow.

BRIEF DESCRIPTION OF THE DRAWINGS

The present invention will be more readily understood from a consideration of the following exemplificative drawings, in which.

DETAILED DESCRIPTION OF PREFERRED EMBODIMENTS

Figure 1:
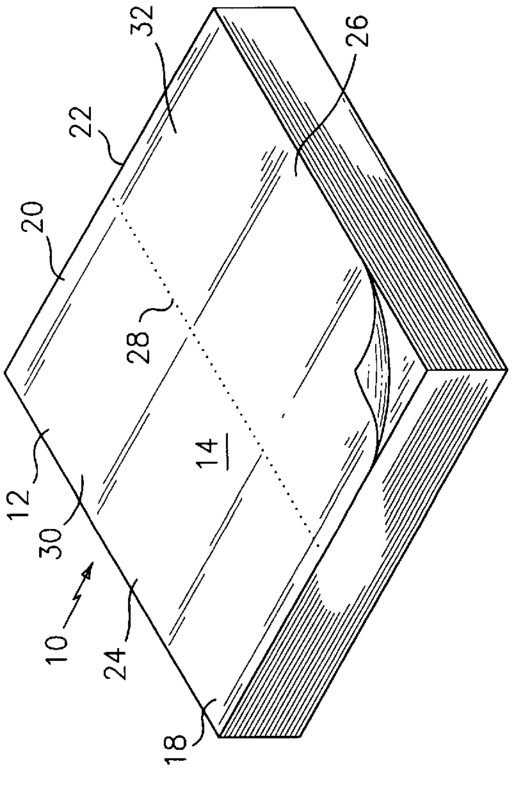
FIG. 1 is a top plan view of a pad of composite sheets of the present invention.

FIG. 1 shows a pad 10 of a plurality of composite sheets 12 of the present invention. Each sheet in the pad is desirably of the same size and configuration. Thus, each sheet 12 has a top surface 14, a bottom surface 16 (FIG. 2), a free end 18, a bindable end 20 which in FIG. 1 includes binding 22 to make a pad, and sides 24 and 26 joining ends 18 and 20.

Sheet 12 includes at least one perforation line 28 extending perpendicular to binding 22 and extending longitudinally on sheet 12 permitting separation of sheet 12 into at least two separate sheets 30 and 32 in this embodiment, each of which is smaller than the sheet 12.

A layer of pressure sensitive adhesive 34 is provided on the bottom surface 16 (FIG. 2) of each sheet 12 and covers at least a portion of the bottom surface of each separate sheet 30 and 32. Thus, if a note or message is written on separate sheet 30, said sheet 30 can be separated along perforation line 28 and said separated sheet 30 will have its own adhesive layer 34 to adhere same to any desired surface. The same can be done for separate sheet 32 and the remaining sheets in pad 10. Alternatively, if a longer note or message is desired, the sheet 12 need not be separated along perforation line 28 so that the entire sheet 12 can be used.

Naturally, the sheets can be of any desired size and contain a number of perforations, for example, the sheets can be one, two or three inch square, rectangular, etc.

It can be readily seen that this obviates the need for keeping a plurality of different size pads since one sheet of the pad of the present invention can be sub-divided into smaller size sheets, as separate sheets 30, 32, or used as larger sheets, as the full size of composite sheet 12, thus making for maximum convenience.

Figure 2:
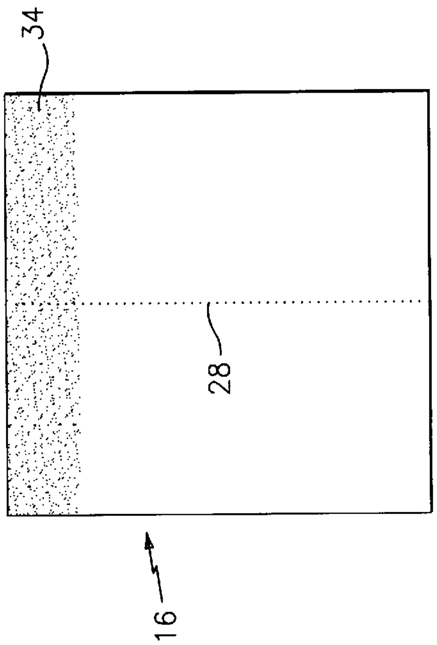
FIG. 2 is a plan view of the bottom surface of a composite sheet of FIG. 1.
Figure 3:
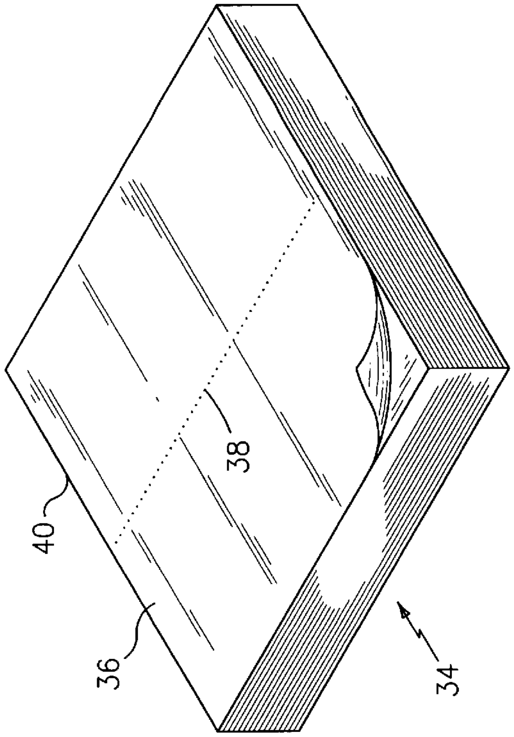
FIG. 3 is a top plan view of a pad of an alternate embodiment of composite sheets of the present invention.
Figure 4:
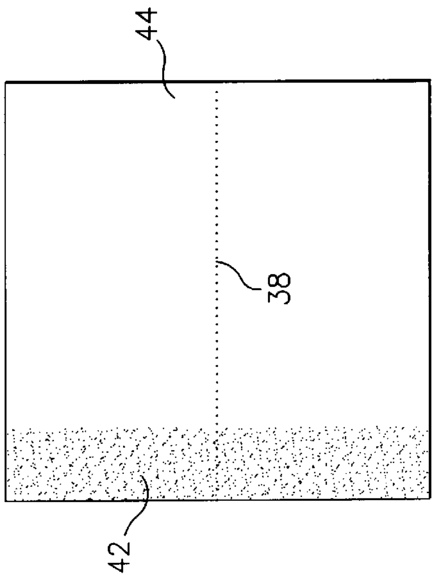
FIG. 4 is a plan view of the bottom surface of a composite sheet of FIG. 3.

FIGS. 3 and 4 show another embodiment of the present invention where pad 34 containing sheets 36, similar to FIGS. 1 and 2, except that perforation line 38 extends laterally on sheet 36 and binding 40 extends longitudinally. Adhesive layer 42 is provided on bottom surface 44 permitting separation of sheets 36 into separate sheets each with an adhesive layer, as in FIGS. 1 and 2. Naturally, it can be readily seen that pad 34 in FIG. 3 is simply a different orientation of pad 10 in FIG. 1 and any desired orientation can be readily used as desired.

Any desired pressure sensitive adhesive can be readily used, desirably a low-tack repositionable adhesive which allows for separation of the sheets and repositioning of the separated sheets on typically flat surfaces. Representative adhesives are described in U.S. Pat. Nos. 4,495,318 and 4,781,306.

Figure 5:
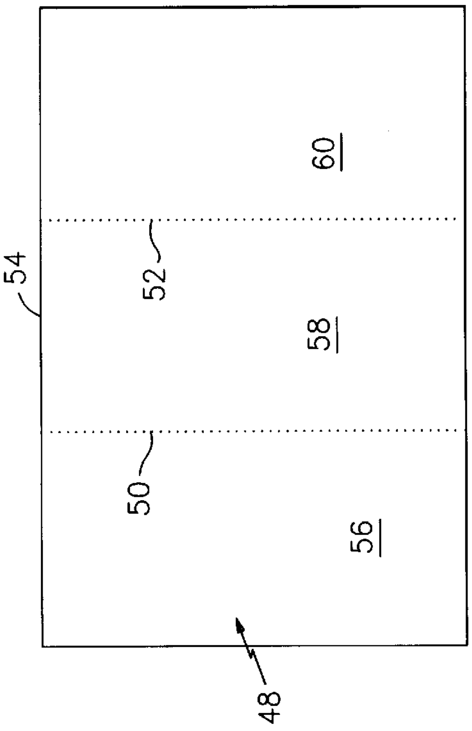
FIGS. 5 and 6 are top and bottom views of an alternate embodiment of a composite sheet of the present invention.
Figure 6:
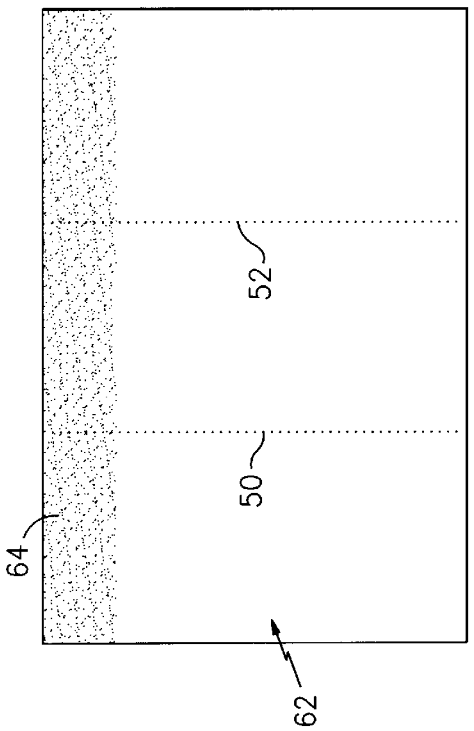

FIGS. 5 and 6 show top and bottom views, respectively, of another embodiment of a composite sheet of the present invention which desirably is used in a pad of like sheets as in FIGS. 1–4. Each sheet 48 includes two perforation lines

50 and 52 parallel to each other and perpendicular to bindable end 54 permitting sheet 48 to be separated into three separate sheets 56, 58 and 60, if desired. Bottom surface 62 includes a layer of adhesive 64 covering at least a portion of the bottom surface of each separate sheet 56, 58 and 60 so that each separate sheet can be individually adhered to a surface.

The adhesive layer in all embodiments desirably covers only a minor portion of each separate sheet, as in sheets 56, 58 and 60, for example, less than 25% of the bottom surface is covered by adhesive and preferably the adhesive represents only a discrete strip of adhesive sufficient to adhere the sheets to each other and to adhere the separated sheets to a generally flat surface.

Figure 7:
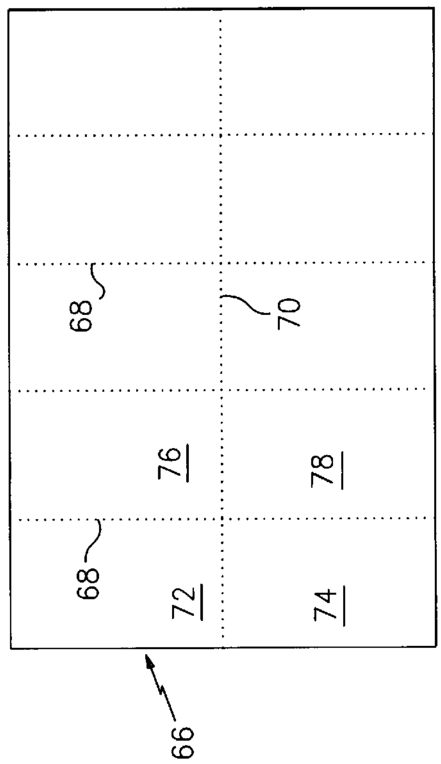
FIGS. 7 and 8 are top and bottom views of a further embodiment of a composite sheet of the present invention.
Figure 8:
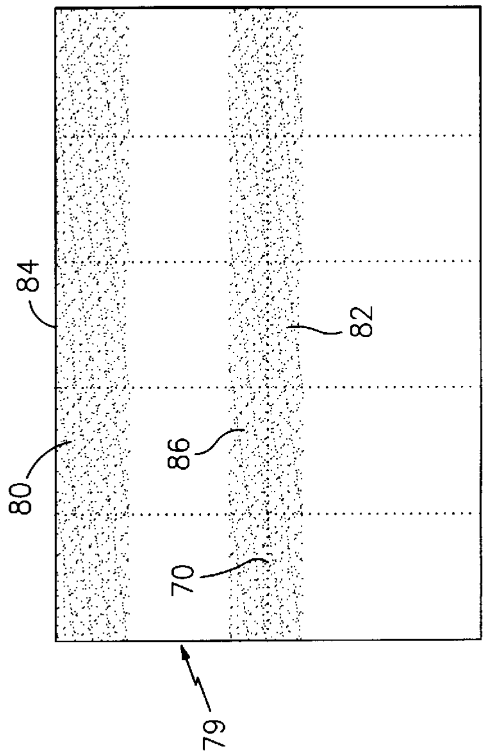

FIGS. 7 and 8 show top and bottom views, respectively, of another embodiment of a composite sheet of the present invention which desirably is used in a pad of like sheets as in FIGS. 1–4. Each sheet 66 includes both parallel perforation lines 68 and at least one perforation line 70 perpendicular to lines 68. Thus, sheet 66 includes a plurality of intersecting perforation lines permitting separation of sheet 66 into a plurality of separate, smaller sheets as sheets 72, 74, 76, 78, etc. In the embodiment shown, the perforation lines are homogeneously distributed to permit formation of separate sheets of the same size. Naturally, this may not necessarily be the case so that the perforation lines may be non-homogeneously distributed to permit the formation of separated sheets of different sizes.

As shown in the bottom view of FIG. 8, two separate adhesive stripes 80 and 82 may be provided on bottom surface 79, one stripe 80 adjacent bindable end 84 and one stripe 82 in the center of sheet 66 beneath perforation line 70 so that each separated sheet is provided with adhesive. Alternatively, upper stripe 80 may be dispensed with, if desired, and a separate adhesive stripe 86 provided above perforation line 70 so that adhesive is provided on both sides of central perforation line 70. Naturally, upper stripe 80 may be omitted if stripes 82 and 86 are used, and strip 86 may be omitted if stripes 80 and 82 are used. In all cases, each separated sheet has adhesive on the bottom surface.

The specific number of separated sheets in FIGS. 7 and 8 is representative only and naturally wide variations may be used, if desired.

Figure 9:
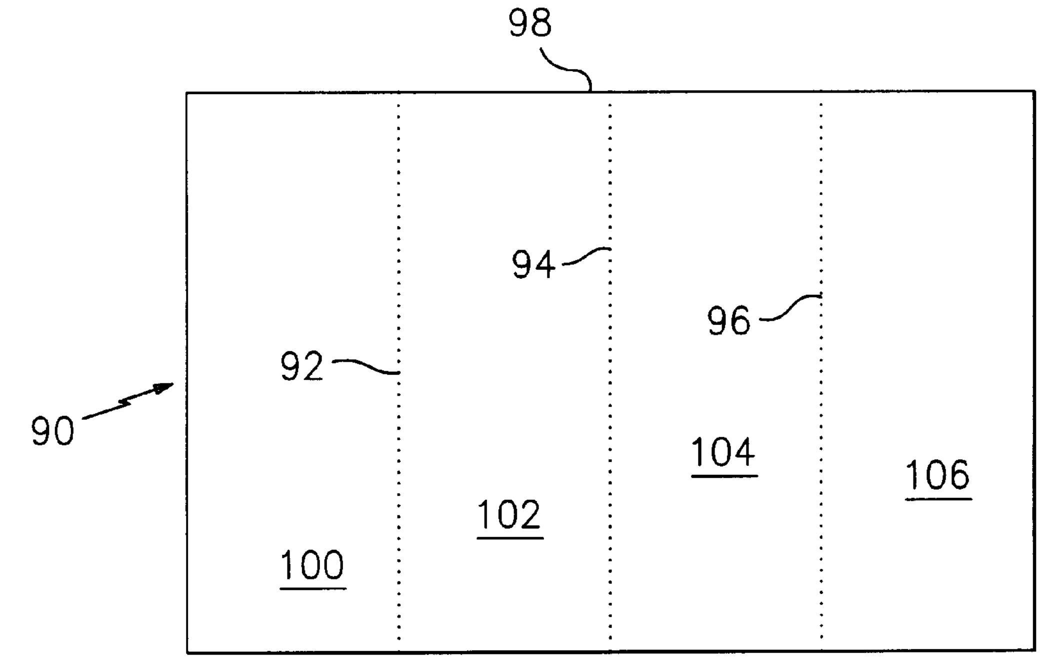
FIGS. 9 and 10 are top and bottom views of a still further embodiment of a composite sheet of the present invention.
Figure 10:
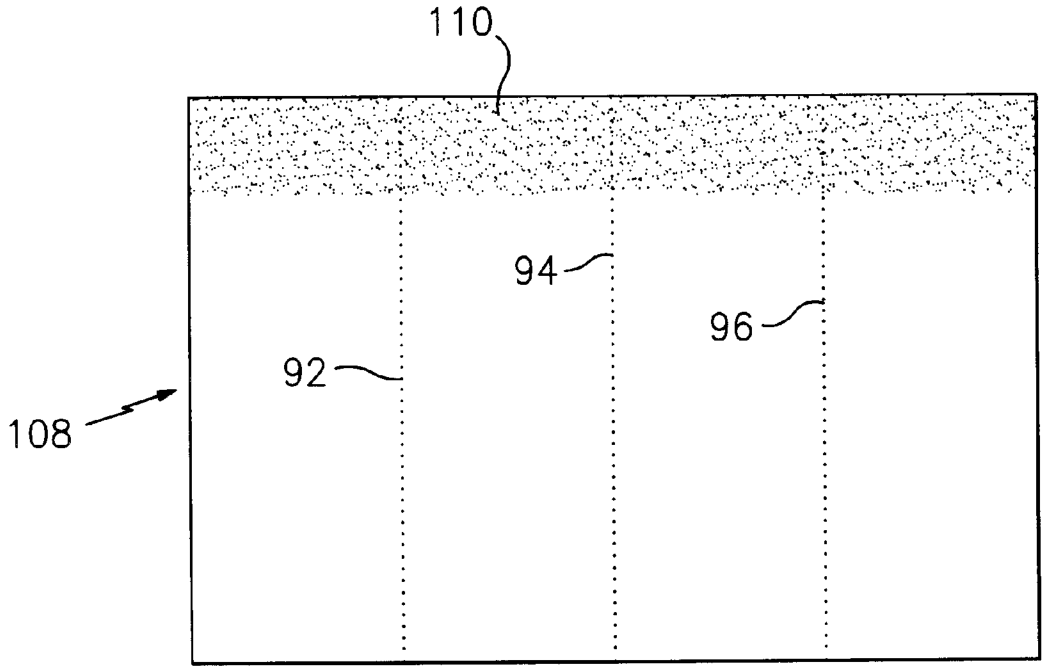

FIGS. 9 and 10 show top and bottom views, respectively, of another embodiment of a composite sheet of the present invention which desirably is used in a pad of like sheets as in FIGS. 1–4. Each sheet 90 includes three perforation lines 92, 94 and 96 parallel to each other and perpendicular to bindable end 98 permitting sheet 90 to be separated into four separate sheets 100, 102, 104 and 106, although if desired a larger number of perforation lines and separated sheets can be used.

Bottom surface 108 includes a layer of adhesive 110 covering at least a portion of the bottom surface of each separate sheet 100, 102, 104 and 106 so that each separate sheet can be individually adhered to a surface.

It is to be understood that the invention is not limited to the illustrations described and shown herein, which are deemed to be merely illustrative of the best modes of carrying out the invention, and which are susceptible of form, size, arrangement of parts and details of operation. The invention rather is intended to encompass all such modifications which are within its spirit and scope as defined by the claims.

What is claimed is:

1. A pad including a stack of like composite sheets, which comprises:

a plurality of paper sheets each having a top surface which is entirely flat, a bottom surface which is entirely flat, a bindable end, a free end and sides joining said ends, said sheets being stacked together in the same orientation with said bindable end of said sheets being bound together to form a bound stack of sheets, and wherein said top surface faces upward, and wherein said bindable end, free end and sides each have edges thereof, with said plurality of paper sheets being bound together at the bindable edge so that each entire sheet is removable;

at least one perforation line in each paper sheet extending from the bound edge to the free edge permitting separation of each entire paper sheet into at least two removable separate sheets each of which is smaller than the paper sheet; and a layer of pressure sensitive adhesive on the flat bottom surface of each paper sheet covering a portion of the flat bottom surface of each separate sheet and extends to the bound edge, wherein said adhesive is a discrete strip of adhesive that covers a portion of the flat bottom surface of each separate sheet, said portion being less than the entire flat bottom surface, wherein said pad consists solely of sheets with adhesive on the bottom surfaces thereof and wherein said adhesive is in direct contact with the underlying next sheet.

2. A pad according to claim 1, wherein said adhesive strip covers less than 25% of each flat bottom surface of each separate sheet.

3. A pad according to claim 1, wherein said adhesive strip is perpendicular to said perforation line.

4. A pad according to claim 1, including a plurality of said perforation lines in said paper sheet permitting separation of said paper sheet into a plurality of separate sheets each of which is smaller than the paper sheets, wherein each separate sheet is provided with an adhesive strip on a portion of the flat bottom surface thereof.

5. A pad according to claim 1, including at least two perforation lines, wherein said perforation lines are parallel to each other.

6. A pad according to claim 1, wherein said adhesive is parallel to said bindable end and said perforation line is perpendicular to said bindable end.

7. A pad according to claim 4, including a plurality of intersecting perforation lines permitting separation of said paper sheet into a plurality of separate sheets smaller than the paper sheet, wherein the adhesive is an adhesive strip that covers a portion of the bottom surface of each separate sheet which is less than the entire flat bottom surface of each separate sheet, wherein intersecting perforation lines intersect centrally of said sheets, with one perforation line extending from the bound edge to the free edge and a second perforation line extending from one side edge to a second side edge, to divide each sheet into at least four substantially equal sized separate sheets, and wherein the adhesive extends to an edge of each sheet.

8. A pad according to claim 7, including at least two separate strips of adhesive spaced from each other on the bottom surface.

9. A pad according to claim 8, wherein one of said strips of adhesive is adjacent the bindable end of said paper sheet and another is on the central surface of said paper sheet beneath a central perforation line.

10. A pad according to claim 7, including a central perforation line extending from one side of the paper sheet to another and an adhesive strip on both sides of said central perforation line.

11. A pad according to claim 1, wherein said top surface of said paper sheet is free from adhesive.

12. A pad according to claim 1, wherein said perforation line extends perpendicular to the bound ends.

13. A pad according to claim 1, wherein said adhesive strip is adjacent an end of each paper sheet.

14. A pad according to claim 1, wherein said adhesive strip extends across a central surface of said paper sheet.

15. A pad according to claim 1, wherein said paper sheets are bound together adjacent said adhesive strip.

* * * * *